United States Patent [19]

Burnett et al.

[11] 4,210,920

[45] Jul. 1, 1980

[54] MAGNETICALLY ACTIVATED PLANE WAVE STIMULATOR

[75] Inventors: James E. Burnett, Xenia; E. J. Doyle Kenworthy, Dayton, both of Ohio

[73] Assignee: The Mead Corporation, Dayton, Ohio

[21] Appl. No.: 7,921

[22] Filed: Jan. 31, 1979

[51] Int. Cl.² .......................................... G01D 15/18
[52] U.S. Cl. .................................................... 346/75
[58] Field of Search ............................. 346/75, 140 R

[56] References Cited

U.S. PATENT DOCUMENTS

| | | | |
|---|---|---|---|
| 3,287,734 | 11/1966 | Kazan | 346/75 X |
| 3,373,437 | 3/1968 | Sweet et al. | 346/140 R X |
| 3,596,275 | 7/1971 | Sweet | 346/75 X |
| 3,701,476 | 10/1972 | Houser | 346/75 X |
| 3,739,393 | 6/1973 | Lyon et al. | 346/75 X |
| 4,138,687 | 2/1979 | Cha et al. | 346/75 |

Primary Examiner—George H. Miller, Jr.
Attorney, Agent, or Firm—Biebel, French & Nauman

[57] ABSTRACT

An ink jet printing head (10) is provided for use in an ink jet printing device, having an ink supply reservoir (14) formed in a manifold (12) for supplying ink to a plurality of orifices (16) formed in rows in an orifice plate (18) extending longitudinally along the bottom of the manifold (12) and forming the lower part of the reservoir (14) through which a plurality of droplets of fluid can be expelled under pressure. In one embodiment, the upper surface of the reservoir (14) is closed by a vibrationally flexible and magnetically active diaphragm plate (32) having its lower surface in contact with the upper surface of the liquid in the reservoir (14). An electromagnetic device is provided having a portion (40) coupled to the diaphragm (32) to form a magnetic flux path therethrough and another portion (38) positioned adjacent and above the diaphragm (32) so that that portion (38) and the diaphragm (32) form opposite poles of the electromagnet. A signal generator means (48) then imposes an alternating electric current of the desired frequency on the electromagnetic device so as to vibrate the diaphragm (32) and cause vibration of the liquid which in turn produces uniform series of droplets from the orifices (16). An alternative structure utilizes a thin orifice plate (62) with the electromagnetic device coupled to the orifice plate (62) rather than the diaphragm (32) so that the orifice plate (62) is vibrated to cause a uniform series of droplets to be expelled from the orifices (16). Both embodiments also preferably are provided with a bias (50) on the diaphragm (32) or the orifice plate (62), whichever is vibrated, which then only permits vibration of the orifice plate (62) or diaphragm (32) in one direction.

18 Claims, 5 Drawing Figures

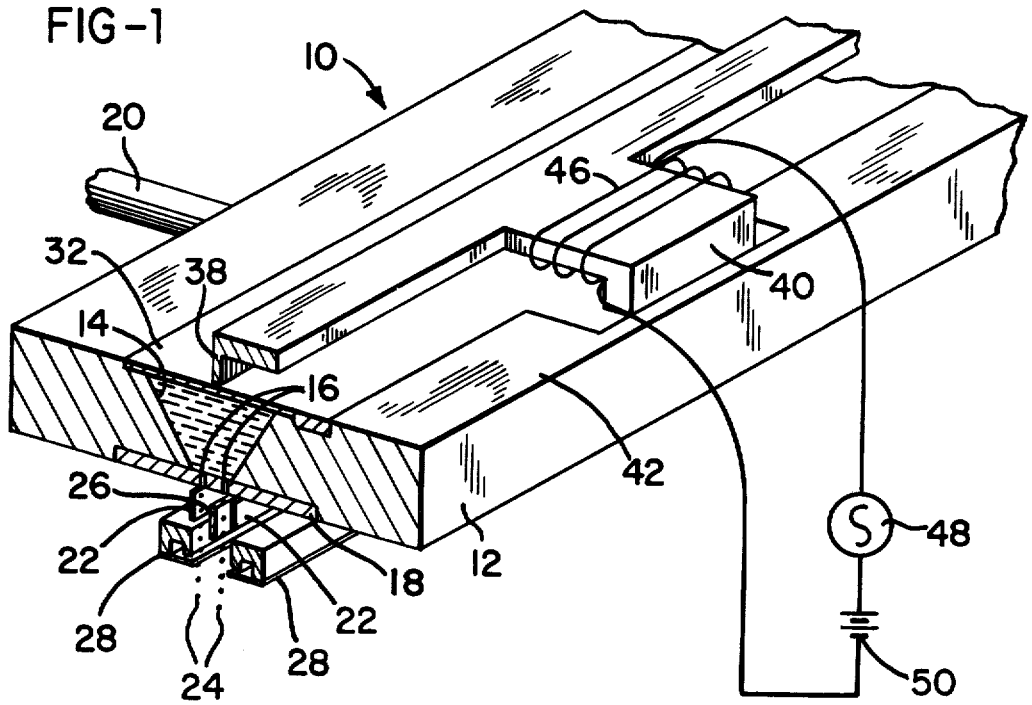
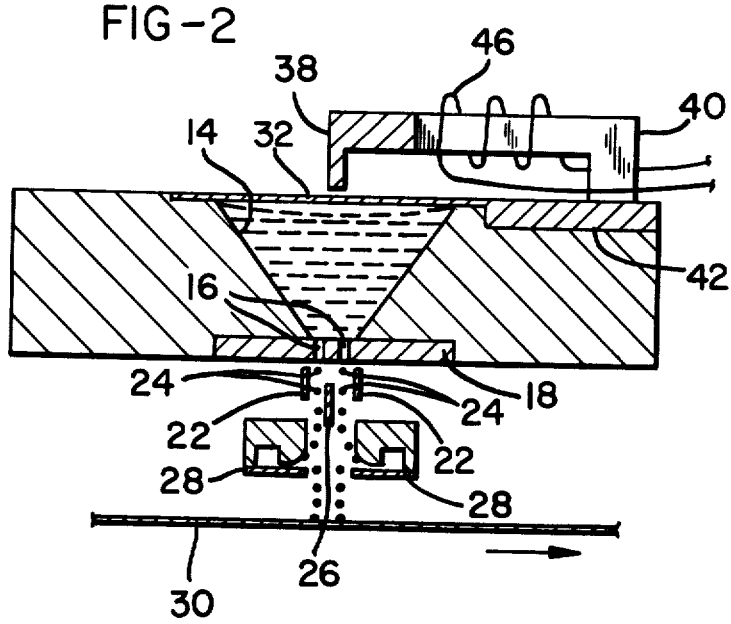

MAGNETICALLY ACTIVATED PLANE WAVE STIMULATOR

BACKGROUND OF THE INVENTION

1. Field of the Invention

The present invention relates to ink jet printing devices, and more particularly, to recording apparatus which utilize a plurality of streams of droplets which are controlled to print on a printing medium.

2. Prior Art

The present system is especially suited for use in prior art devices of the general type disclosed for example, in U.S. Pat. Nos. 3,701,476 and 3,739,393. Such ink jet printing devices generate series of droplets from a plurality of orifices disposed in a row or rows and formed in a manifold or printing head so as to produce an array extending laterally over a recording medium or surface and expell drops of ink or other liquid toward the surface. The systems are stimulated at a common predetermined frequency so that uniform filament lengths and droplets are generated from each orifice in a fixed phase relationship with the stimulating source.

In such devices, the drops travel toward the recording surface and are selectively charged in binary fashion according to intelligence signals from a computer or input source. The drops to be excluded or caught are electrostatically charged and then passed through a constant electrostatic deflection field which deflects them from their initial trajectory into catchers, while uncharged drops are deposited on the recording medium since they are unaffected by the deflection field and follow their initial trajectory onto the receiving surface.

In order for such systems to operate properly, a high degree of accuracy of uniformity in drop generation is important since the inability to maintain the proper phase relationship between the stimulating source and the drop generation results in the improper charging of droplets so that control over those droplets which are not supposed to contact the recording surface can be lost thus reducing the clarity of the intended print configuration.

Many different means have been devised for controlled stimulation of filament and droplet formation, such as those utilized in the above referred to patents. For example, these systems utilize a mechanical stimulator which extends through the fluid supply reservoir and vibrates the orifice plate so as to cause a traveling wave of vibrations along the length of the orifice plate. This causes generation of filaments of a particular length and uniform formation of droplets at the ends of the filaments with adjacent orifices producing droplets in predictable phased relationship to one another so that adequate control of drop charging and catching can be maintained. However, since the drop generation along the row of orifices is cyclical due to the use of traveling wave technique to produce the series of uniform droplets, complicated computer switching techniques must be utilized to account for the phase shifting so that charging and deflection of the desired droplets is obtained.

It is therefore more advantageous to utilize a drop generation stimulation system which causes simultaneous stimulation of all of the orifices along an orifice plate. Attempts have been made to accomplish this by various techniques such as that disclosed for example in French Pat. No. 2,999,093, in which the orifice plate along with the reservoir of printing fluid is vibrated by magnetic attraction to a magnetically activated portion of the orifice plate and reservoir with an attractive electromagnet being stimulated at the desired frequency of vibration to produce the uniform series of droplets from the orifices. Such a device, however, is relatively massive since the orifice plate and manifold containing the reservoir and also the fluid, must be vibrated up and down at high frequencies.

Another method devised in the prior art for causing uniform stimulation of drop generation from a plurality of orifices and which also employs magnetic attraction as its motive force, involves the use of the magnetostrictive characteristics of many materials. In essence, a magnetic field is established which passes through the magnetostrictive material and causes expansion or contraction of the material which is placed either adjacent the orifice or is somehow in contact with the fluid to cause the fluid to be expelled through the orifice upon excitation of the magnetic field. Such devices are disclosed, for example, in U.S. Pat. Nos. 4,057,807 and 3,679,132.

However, these proposed structures are not particularly suited for producing uniform generation of droplets from long rows of orifices simultaneously and therefore require reliance on activating the magnetic field sources simultaneously which results in difficulties similar to those encountered with traveling wave stimulation techniques which results in lack of uniformity in the magnetic field and force applied to the liquid due to variations in the parts of the assemblies.

Still further devices have been proposed which actually use a magnetostrictive device coupled to the orifice nozzles to move the nozzles either in the plane of drop generation or perpendicular thereto, such as for example, those devices disclosed in U.S. Pat. Nos. 3,287,734 and 3,737,914. However, these devices would necessarily be operated at relatively low frequencies due to the mass required to be moved and would thus substantially restrict the speeds at which ink jet printing could be obtained.

SUMMARY OF THE INVENTION

The present invention overcomes the above described difficulties and disadvantages associated with the prior art devices by providing a system which uses a magnetically activated bending plate in the form of a pressure plate disposed remote from the orifice plate containing at least one row of orifices, or utilizes a magnetically active orifice plate which itself is vibrated to cause production of uniform filaments and drops along the entire row or rows of orifices simultaneously. This is accomplished generally by the provision of a long magnetically active bar extending immediately adjacent the vibrationally active area of the pressure plate or orifices plate and which is coupled at a remote location to the orifice plate so that the bar acts as one pole of an electromagnet and the pressure plate or orifice plate acts as the other pole so that when an electric current is induced in the bar the two poles tend to attract one another and thus cause vibration of toe orifice plate or pressure plate as the case may be.

An electrical coil surrounding the center section of a core member supporting the bar is stimulated by an alternating current from a current source at the desired frequency. It is preferred that a DC bias voltage of ½ the maximum amplitude of vibration be applied to prevent frequency doubling of vibration. It is also preferable that the active, i.e. vibrating portion of the pressure plate or orifice plate be approximately the width of ½ the resonant frequency of vibration thereof so that when it is excited at such frequency or harmonic thereof, maximum energy will be transmitted to the printing liquid.

In the case of a vibrating pressure plate, the pressure plate covers the top portion of the reservoir formed in the manifold of the ink jet printing head immediately opposite and parallel to the orifice plate containing the row or rows of orifices extending along the length of the reservoir. A bar which forms one pole of an electromagnet is disposed parallel to and immediately adjacent the center of the pressure plate and extends along the entire length of the active area thereof. Either a single core or multiple cores then extend rearward from the bar and are coupled to an extending of the pressure plate which is not within the active area of the pressure plate. It multiple core sections are used a plurality of electrical windings connected in series around each core can be utilized so that a simultaneous activation of the core sections will result, thus ultimately resulting in uniform attraction and repulsion between the bar and the pressure plate. With the DC bias referred to above being applied in series with the alternating current source which generates the alternating current at the desired frequency, the pressure plate will be attracted towards the bar only when the polarity of the bias and generator are the same and thus will stimulate the droplets from the orifices at the desired frequency.

In the case of an active orifice plate, the bar shaped member extends parallel to the orifice plate and immediately adjacent thereto as well as adjacent the row or rows of orifices along the length of the orifice plate. The core section of the electromagnet which supports the attractive bar extends rearwardly from the bar and is coupled to the orifice plate remote from the active area of the orifice plate so that again, opposite attractive poles are created between the attractive bar and the orifice plate. Again, with the correct DC bias source in series with the alternating current source, the orifice plate will be vibrated along its active area at the desired frequency so that drops will be stimulated at that frequency.

BRIEF DESCRIPTION OF THE DRAWINGS

FIG. 1 is a partial pictorial view of a printing head assembly illustrating a first preferred embodiment of the present invention;

FIG. 2 is a cross sectional view through the embodiment of FIG. 1;

DETAILED DESCRIPTION OF THE PREFERRED EMBODIMENT

Figure 3:
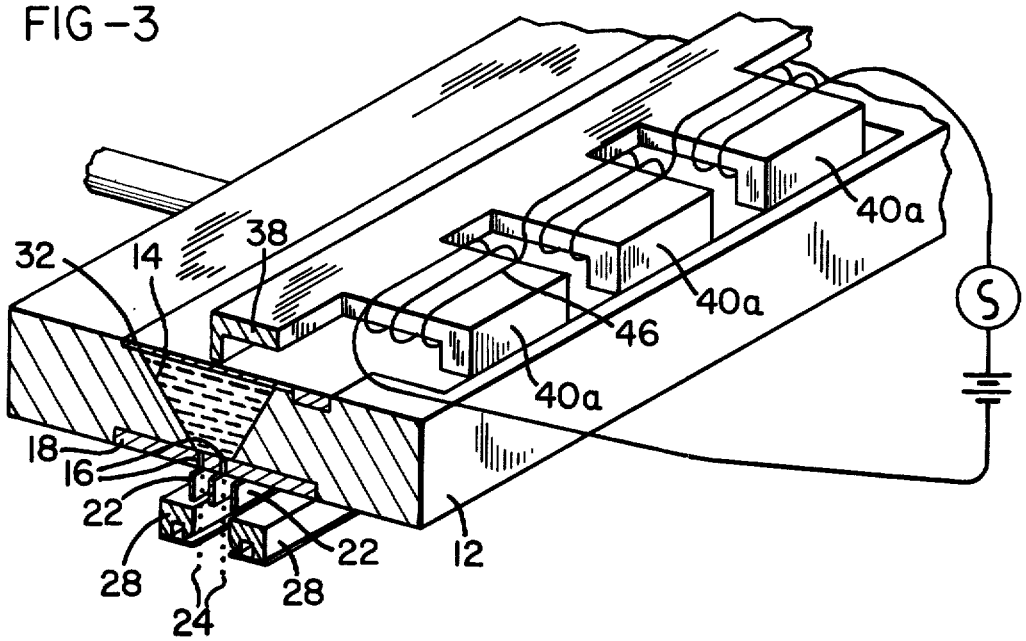
FIG. 3 is a partial pictorial view of a second alternative embodiment of the printing head assembly of the present invention.

A first preferred embodiment of a recording head 10 of the present invention is pictorially illustrated in FIG. 1. The recording head 10 basically comprises a manifold 12 providing a reservoir 14 in the central region thereof for supplying a printing liquid to the plurality of orifices 16 formed in the orifice plate 18. In this embodiment the orifice plate 18 is relatively rigid so that it will not vibrate when the liquid is excited at the desired frequency, and is cemented or otherwise secured to the lower portion of the manifold 12 so that the plurality of rows of orifices 16 extend symetrically down the central region of the lower portion of the reservoir 14 formed in the manifold.

A printing liquid input tube 20 supplies conductive printing liquid under pressure to the reservoir 14 and thus to the plurality of orifices 16. Charging members 22 are of the type, for example, disclosed in Robertson U.S. Pat. No. 3,604,980, or similar charging mechanisms which are capable of placing a desired level of charge on droplets 24 as they are expelled from orifices 16.

Downstream from charging members 22 in the movement of droplets 24 is a deflection ribbon 26 which deflects appropriately charged drops outwardly towards catchers 28 associated with each row of droplets in a manner similar to that explained in the above referred to Robertson patent, so that appropriately charged drops are prevented from falling on the recording medium 30 permitting the uncharged drops to produce the desired print pattern.

Mounted to the upper surface of printing head 10 is a flexible pressure plate 32 capable of sufficiently flexing at the desired frequency of vibration to cause downward pressure impulses in the liquid contained in the reservoir 14 so as to produce droplets 24 of the desired frequency from the orifices 16. Pressure plate 32 is cemented or otherwise secured to the upper recessed surface of manifold 12 so as to be securely fastened to the manifold in order that an active area is defined in the central region of the pressure plate by the abutting walls defining the top of the reservoir 14. The fluid contained in the reservoir engages the lower surface of pressure plate 32 during operation.

Figure 5:
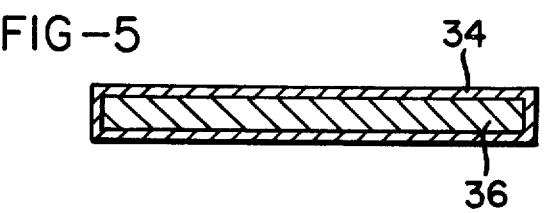
FIG. 5 is a cross sectional view through a pressure plate or through an orifice plate utilized in the preferred embodiments of the present invention illustrating a magnetically active surface and a magnetically inactive core.

Pressure plate 32 can either be constructed of a solid piece of magnetically active material or, as shown in FIG. 5, may be provided with a magnetically active coating 34 and have a magnetically inactive core member 36, so long as the coating 34 provides sufficient magnetic properties to cause the requisite vibration of the composite pressure plate 32 so constructed.

The electromagnetic device used to cause vibration of the pressure plate 32 at the desired frequency basically comprises an elongated magnetically active bar 38 supported at at least one location along its length by an L-shaped cross sectioned member 40 which is secured to the upper surface of an extension 42 of pressure plate 32 so as to be magnetically coupled thereto in order to provide a path for magnetic flux lines through both the pressure plate 32 and the elongated bar 38. Bar 38 has an end portion 44 extending along the surface of pressure plate 32 immediately adjacent and parallel to the center line of the active region of the pressure plate defined by the upper side walls of the reservoir 14.

An appropriate number of windings of electrical wire are wrapped about the L-shaped cross section member 40 to form a coil 46 sufficient to produce the desired concentration of magnetic flux lines in the elongated bar 38 when an alternating electric current of predetermined amplitude and frequency is passed through the electric wire by generator 48. For the reasons explained below, a DC power source 50 is connected in series with generator 48 to produce a bias voltage of approximately ½ the maximum amplitude of the voltage of generator 48 in order to prevent frequency doubling and to cause the pressure plate to flux in only one direction from the nominal, i.e. flat, position.

This construction in cross section, as for example as illustrated in FIG. 2, presents an essentially U-shaped electromagnet in which the two poles are formed by the elongated bar 38 and pressure plate 32 with the electric coil 46 being wound around the U-shaped portion to induce the magnetic field through the core section of the electromagnet formed by member 40.

As mentioned above a DC bias source 50 provides a biasing current through coil 46. If the bias is one-half the peak amplitude of the alternating current supplied by generator 48, the pressure plate 32 will bend in only one direction which, is outwardly away from the reservoir 14 and the orifice plate 18. This is because when a bias current is supplied to the coil 46 the field will increase when the excitation is of the same polarity and will decrease when the excitation current is of reverse polarity. Thus, as the alternating current of the desired frequency and amplitude is generated by generating means 48, plate 32 will only bend outwardly at the desired frequency; the frequency of the alternating current supplied by generator 48 being twice that of the ultimate desired frequency of production of drops from the orifices 16, since one-half of the cycle is being cancelled by the DC current source 50.

It is further preferable that the width of the active area of the pressure plate 32 be not greater than one-half the wave length of the vibrating frequency of the pressure plate so that secondary modes of vibration will not be induced which would interfere with the primary wave form as is explained more fully in Lyon U.S. Pat. No. 3,739,393.

Referring now to the second preferred embodiment as illustrated in FIG. 3, it is constructed essentially the same as the embodiment of FIG. 1 with like parts being indicated with the same numerals, with the exception that the electromagnetic device is provided with a plurality of support members 40a in place of the single support member 40 of the embodiment of FIG. 1. The advantage of this type of support is the ability to maintain essentially equal strength magnetic flux along the bar 38 where the extent of the bar is such that a uniform magnetic flux could not be maintained with only a single centrally located core member 40. In order to induce the uniform magnetic flux the coils 46 are wound about the core members 40a in series connections so that phased magnetic fields will be developed in the core and the elongated member 38 and pressure plate 32.

Figure 4:
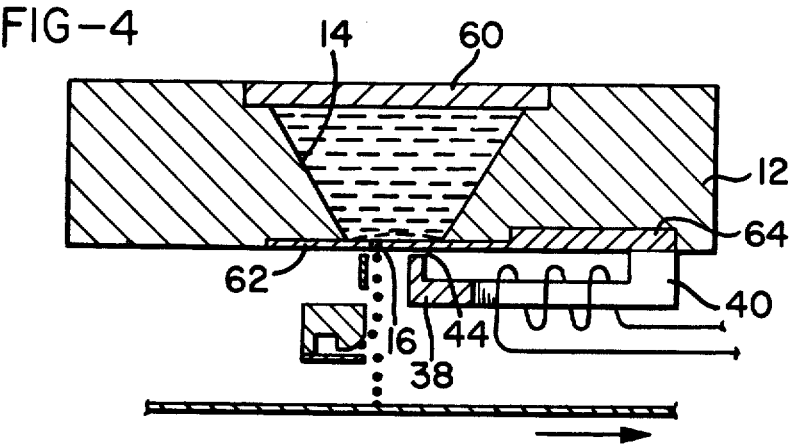
FIG. 4 is a cross sectional view of a third alternative embodiment of a printing head in accordance with the present invention.

A third alternative preferred embodiment is illustrated in FIG. 4. Generally, in this embodiment the electromagnetic device is used in conjunction with a flexible orifice plate rather than a flexible pressure plate remote from a relatively rigid orifice plate as disclosed in the previous embodiments. More particularly, this embodiment has the top surface of the reservoir 14 closed off with a rigid plate 60; the reservoir being supplied with fluid under pressure in the same manner as the previously described embodiments. The orifice plate 62 is relatively thin and flexible in at least the active vibrating portion thereof as defined by the abutting edge portions of the lower edges of the reservoir 14 defined by the manifold 12. The orifice plate 62 is cemented or otherwise rigidly secured to the manifold 12 except for the active area in the reservoir 14.

In this embodiment the elongated, magnetically active bar 38 is secured by the L-shaped core member 40 to the thickened extension 64 of orifice plate 62 so as to present a path for the magnetic flux between the upper end portion 44 of bar 38 and the active portion of the orifice plate 62. As with the previous embodiments, the upper portion 44 of bar 38 extends immediately adjacent and parallel to the orifice plate 62.

In this embodiment, however, the location of the upper most portion 44 of bar 38 is somewhat off center from the longitudinal center line of the active area of orifice plate 62. However, if the width of the active area of the orifice plate 62 is less than one-half the wavelength of the resonant frequency of vibration, it is believed that sufficient uniformity in vibration along the length of the orifice plate 62 will be achieved that uniform filaments and droplets will be ejected from the row of orifices 16, as desired.

In operation, this embodiment will perform in essentially the same manner as the previously described operation of the other embodiments and will therefore not be described in detail herein. It is further contemplated that in any of these embodiments a permanent magnet might be employed to provide the bias in place of the biasing current source 50 placed in series with the alternating generator 48.

Although the foregoing illustrates the preferred embodiments of the present invention, other variations are possible. All such variations as would be obvious to one skilled in this art are intended to be included within the scope of the invention as defined by the following claims.

What is claimed is:

1. An ink jet printing head for use in an ink jet printing device, comprising:
    manifold means for defining a printing liquid reservoir having a plurality of orifices defined in a surface thereof through which the liquid is expelled to form a continuous series of droplets from each orifice directed towards a printing medium;
    magnetically active diaphragm means communicating with said reservoir remote from said orifices;
    electromagnetic means having a portion coupled to said diaphragm means to form a magnetic flux path therethrough and another portion disposed adjacent said diaphragm means such that said other portion and said diaphragm means form opposite poles of an electromagnet; and
    signal generating means for imposing an alternating electric current on said electromagnetic means thereby causing said diaphragm means to vibrate so as to stimulate said drops at a desired frequency.

2. An ink jet printing head as defined in claim 1 wherein said electromagnetic means includes:
    a generally T-shaped member having the base portion thereof in contact with said diaphragm means and the crossbar portion thereof disposed in parallel spaced relation above the surface of said diaphragm means; and
    an electromagnetic coil formed about a portion of said base portion and operatively connected to said signal generating means.

3. An ink jet printing head as defined in claim 1 wherein said electromagnetic means includes:
    a bar-shaped portion disposed in spaced parallel relation above the surface of said diaphragm means and a plurality of L-shaped portions engaging said diaphragm means; and a plurality of series connected electromagnetic coils each formed separately about a respective one of said L-shaped portions and operatively connected to said signal generating means.

4. An ink jet printing head as defined in claim 1 wherein said manifold means includes:

an elongated rectangular block having an elongated reservoir defined therein;

means supplying printing liquid to said reservoir under pressure;

said orifices being defined as two parallel rows along said reservoir; and said magnetically active diaphragm means including an elongated diaphragm plate disposed parallel to said surface defining said orifices and forming a closure for a top portion of said reservoir, said diaphragm plate being secured at its outer margins to said manifold means, a central portion of said diaphragm plate defined by abutting edge portions of said block defining said reservoir, being flexible along its length under the influence of said electromagnetic means.

5. An ink jet printing head as defined in claim 4 wherein said other portion of said electromagnetic means includes a rectangular cross sectional bar extending in spaced parallel relation along the surface of said diaphragm plate outside of said reservoir along the center line of said central portion of said diaphragm so as to cause substantially uniform crosswise bending along the length thereof under the influence of said electromagnetic means.

6. An ink jet printing head as defined in claim 1 and further including:

a bias means for imposing a magnetic force on said diaphragm means so as to cause said diaphragm means to vibrate in substantially only one direction from a neutral position.

7. An ink jet printing head as defined in claim 6 wherein said bias means includes imposing a direct current on said electromagnetic means.

8. An ink jet printing heads as defined in claim 7 wherein said diaphragm means is biased to flex away from said reservoir.

9. An ink jet printing head for use in an ink jet printing device, comprising:

manifold means defining a printing liquid reservoir;

a magnetically active orifice plate secured to an outer wall of said manifold in communication with said reservoir and having a plurality of orifices defined therein through which liquid can be expelled from said reservoir under pressure to form a continuous series of droplets from each orifice directed towards a printing medium;

electromagnetic means having a portion coupled to said orifice plate to form a magnetic flux path therethrough and another portion disposed adjacent said orifice plate such that said other portion and said orifice plate form opposite poles of an electromagnet; and signal generating means for imposing an alternating electric current on said electromagnetic means thereby causing said orifice plate to vibrate so as to stimulate said drops at a desired frequency.

10. An ink jet printing head as defined in claim 9 wherein said electromagnetic means includes:

a generally T-shaped member having the base portion thereof in contact with said orifice plate and the crossbar portion thereof disposed in parallel spaced relation above the surface of said orifice plate; and an electromagnetic coil formed about a portion of said base portion and operatively connected to said signal generating means.

11. An ink jet printing head as defined in claim 9 wherein said electromagnetic means includes:

a bar-shaped portion disposed in spaced parallel relation above the surface of said orifice plate and a plurality of L-shaped portions engaging said orifice plate; and a plurality of series connected electromagnetic coils each formed separately about a respective one of said L-shaped portions and operatively connected to said signal generating means.

12. An ink jet printing head as defined in claim 9 wherein said manifold means includes:

an elongated rectangular block having an elongated reservoir defined therein;

means supplying printing liquid to said reservoir under pressure;

said orifices being defined as two parallel rows in said orifice plate extending along said reservoir; and said orifice plate being secured at its outer margins to said block, a central portion of said orifice plate defined by abutting edge portions of said block defining said reservoir being flexible along its length under the influence of said electromagnetic means.

13. An ink jet printing head as defined in claim 12 wherein said other portion of said electromagnetic means includes a rectangular cross sectional bar extending in spaced parallel relation along the surface of said orifice plate outside of said reservoir adjacent the rows of said orifices in said orifice plate so as to cause substantially uniform crosswise bending along the length thereof under the influence of said electromagnetic means.

14. An ink jet printing head as defined in claim 9 and further including:

a bias means for imposing a magnetic force on said orifice plate so as to cause said orifice plate to vibrate in substantially only one direction from a neutral position.

15. An ink jet printing head as defined in claim 14 wherein said bias means includes imposing a direct current on said electromagnetic means.

16. An ink jet printing head as defined in claim 15 wherein said orifice plate is biased to flex away from said reservoir.

17. In an ink jet printing device of the type having a manifold means forming a liquid reservoir, means supplying said reservoir with printing liquid under pressure, a plurality of orifices formed in at least one row along said reservoir through which said printing liquid is expelled to form series of uniform filaments and droplets, means for electrically charging selected ones of said droplets and means for catching said selectively charged droplets, wherein the improvement comprises:

electromagnetic means for causing said expelled drops to be formed from all of said orifices substantially simultaneously along said at least one row of orifices, said electromagnetic means including a magnetically active member having a flexible portion in engagement with said liquid in said reservoir along the extent of said at least one row of orifices, an elongated bar extending in spaced relation immediately adjacent and parallel to said active portion and substantially coextensive with said at least one row of orifices, means coupling said bar and said magnetically active member to form a path for magnetic flux lines therethrough so that said flexible portion will be flexed upon imposition of an electric current on said electromagnetic means, electromagnetic coil means actively associated with said means coupling said bar and said magnetically active member to induce said magnetic flux lines therein upon imposition of an electric current therethrough, and an alternating current supplying electric current to said coil means at a predetermined frequency.

18. An ink jet printing device as defined in claim 17 and further including:

bias means for causing said flexible portion to flex in only one direction from a neutral position upon imposition of an alternating current by said source.

* * * * *